(12) United States Patent
Nestvall

(10) Patent No.: US 6,273,069 B1
(45) Date of Patent: Aug. 14, 2001

(54) METHOD FOR CALIBRATION THE MOMENT OF FUEL INJECTION

(75) Inventor: Per Nestvall, Molndal (SE)

(73) Assignee: AB Volvo Penta, Goteborg (SE)

( * ) Notice: Subject to any disclaimer, the term of this patent is extended or adjusted under 35 U.S.C. 154(b) by 0 days.

(21) Appl. No.: 09/402,658

(22) PCT Filed: Apr. 8, 1998

(86) PCT No.: PCT/SE98/00653

§ 371 Date: Nov. 5, 1999

§ 102(e) Date: Nov. 5, 1999

(87) PCT Pub. No.: WO98/45590

PCT Pub. Date: Oct. 15, 1998

(30) Foreign Application Priority Data

Apr. 8, 1997 (SE) .................................................. 9701279

(51) Int. Cl.[7] .................................................. F02M 37/04
(52) U.S. Cl. .................................... 123/502; 73/119 A
(58) Field of Search .................................. 123/500, 501, 123/502, 449; 73/119 A

(56) References Cited

U.S. PATENT DOCUMENTS 4,265,200  5/1981  Wessel et al. .

FOREIGN PATENT DOCUMENTS 0 598 602   5/1994  (EP) .
2 070 686   9/1981  (GB) .

*Primary Examiner*—Carl S. Miller
(74) *Attorney, Agent, or Firm*—Young & Thompson

(57) ABSTRACT

A method for calibrating the injection time ($\alpha$) of a first fuel (6') in a diesel engine (2). The method comprises the steps of feeding adjustment fluid (6) under pressure to an injection adjuster (3) which comprises an adjuster plunger (4). The diesel engine (2) is made to run at a constant speed (r). The adjuster plunger (4), which is coupled to a roller-bearing ring (15) for adjusting the injection time ($\alpha$) is adjusted with the aid of the pressure of the adjustment fluid (6). The fuel consumption of the diesel engine (2) is measured and the injection time ($\alpha$), when the fuel consumption converts from varying to being constant and/or vice versa, is recorded. The recorded injection time ($\alpha$) is compared with a predetermined injection time ($\alpha_1$) and the injection adjuster (3) is calibrated by regulating the pressure of the adjustment fluid (6) so that the adjuster plunger (4) is set in a position which corresponds to an injection time ($\alpha$) which accords with the predetermined injection time ($\alpha_1$).

12 Claims, 2 Drawing Sheets

METHOD FOR CALIBRATION THE MOMENT OF FUEL INJECTION

CROSS REFERENCE TO RELATED APPLICATION

This is the 35 USC 371 national stage of International application PCT/SE98/00653 filed on Apr. 8, 1998, which designated the United States of America.

FIELD OF THE INVENTION

The present invention relates to a method for calibrating the injection time of a first fuel in a diesel engine, comprising the step of feeding adjustment fluid under pressure to an injection adjuster, which comprises an adjuster plunger. The invention also relates to a method for calibrating the injection time of a second fuel in a diesel engine.

BACKGROUND OF THE INVENTION

It is already known to use a feedback control system to calibrate the injection time of fuel in a diesel engine. A needle lift spreader, which comprises a transmitter for needle lift, sends signals to a control unit when the time for the injection of fuel in the diesel engine starts. A sensor, which is also coupled to the control unit, measures the angle position of the crankshaft at the same time. On the basis of the information fed into the control unit relating to the injection time and the angle position of the crankshaft at the injection time, an injection adjuster can be calibrated by means of an adjuster plunger arranged in the injection adjuster being set in a position which corresponds to an injection time which accords with the predetermined injection time.

A disadvantage of such an arrangement is that the needle lift spreader with a transmitter for needle lift is a relatively expensive component. A further disadvantage is that the diesel engine is provided with a further component if a needle lift spreader with a transmitter for needle lift is used, which gives rise to a further possible source of error on shutdown of the diesel engine.

SUMMARY OF THE INVENTION

The object of the present invention is to make available a method for calibrating the injection time of a first fuel in a diesel engine by means of recording the diesel engine properties and characteristics during the calibration.

According to the invention, this is achieved by the fact that:
- the diesel engine is made to run at a constant speed,
- the adjuster plunger, which is coupled to a roller-bearing ring for adjusting the injection time, is adjusted with the aid of the pressure of the adjustment fluid,
- the fuel consumption of the diesel engine is measured,
- the injection time, when the fuel consumption converts from varying to being constant, and/or vice versa, is recorded,
- the recorded injection time is compared with a predetermined injection time, and
- the injection adjuster is calibrated by regulating the pressure of the adjustment fluid so that the adjuster plunger is set in a position which corresponds to an injection time which accords with the predetermined injection time.

Another object of the present invention is to make available a method for calibrating the injection time of a second fuel in a diesel engine which has been calibrated, by means of the properties and characteristics of the diesel engine having been recorded during the calibration with a first fuel.

According to the invention, this is achieved by the fact that:
- a first fuel which has been used for calibrating the diesel engine is replaced by the second fuel which has a viscosity differing from the viscosity of the first fuel,
- the second fuel is fed under pressure to an injection adjuster which comprises an adjuster plunger,
- the diesel engine is made to run at a constant speed,
- the adjuster plunger, which is coupled to a roller-bearing ring for adjusting the injection time, is adjusted with the aid of the pressure of the second fuel,
- the fuel consumption of the diesel engine is measured,
- the injection time, when the fuel consumption converts from varying to being constant, and/or vice versa, is recorded,
- the recorded injection time is compared with the injection time which was obtained upon calibration with the first fuel, at a speed which corresponds to the said constant speed, and
- the injection adjuster is calibrated by regulating the pressure of the second fuel so that the adjuster plunger is set in a position which corresponds to an injection time which accords with the injection time which was obtained upon calibration with the first fuel.

Such calibration methods eliminate the need for an injector with a needle lift transmitter, which results in a less costly and more operationally reliable engine construction compared with the feedback control system.

BRIEF DESCRIPTION OF THE DRAWINGS

The invention will be described in greater detail hereinbelow with reference to the illustrative embodiment shown on the attached drawing, in which.

DETAILED DESCRIPTION OF THE INVENTION

Figure 1:
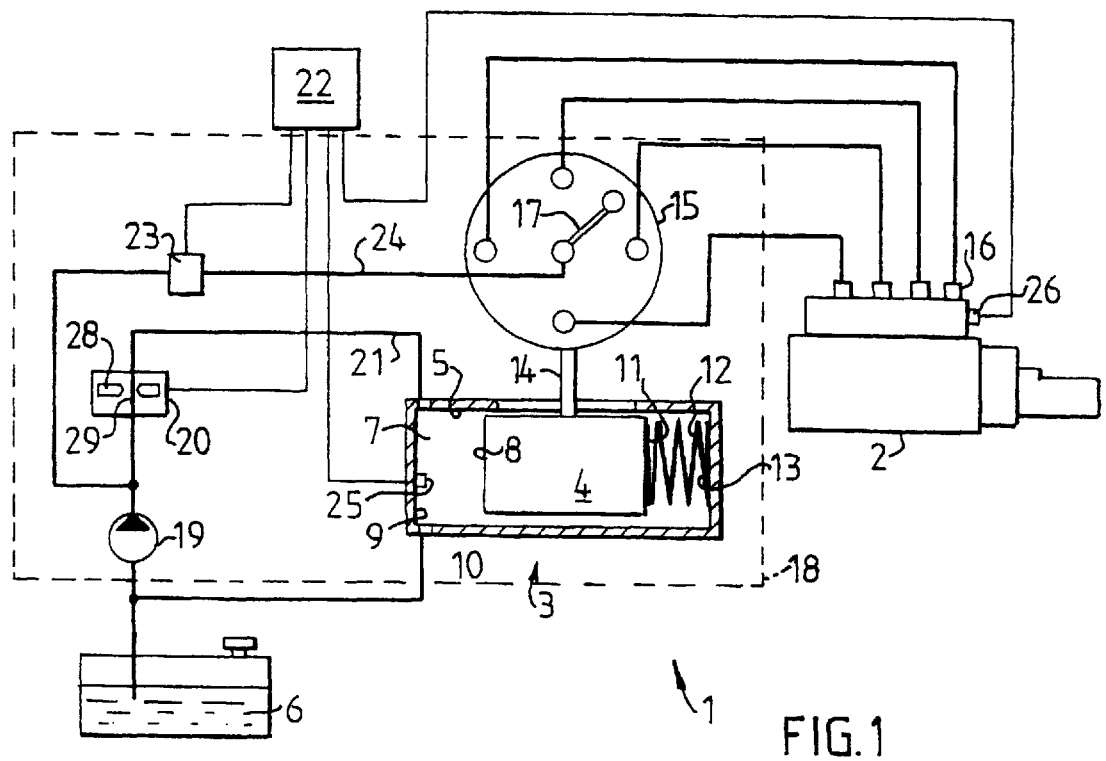
FIG. 1 shows a diagrammatic view of an injection system for a diesel engine.

FIG. 1 shows a diagrammatic view of an injection system 1 for a diesel engine 2. The injection system 1 comprises an injection adjuster 3 which in turn comprises an adjuster plunger 4 which can be displaced in a cylinder barrel 5 counter to a spring force, by means of the fact that a pressure fluid 6 in the form of the diesel engine fuel 6 is conveyed under pressure to a cylinder chamber 7 on a first surface 8 of the adjuster plunger 4. The cylinder chamber 7 is delimited by a first end wall 9 arranged on the cylinder barrel 5, the first surface 8 of the adjuster plunger 4 and the cylinder wall 10 of the cylinder barrel 5. Arranged against a second surface 11 of the adjuster plunger 4 there is a helical spring 12, which is tensioned between the second surface 11 of the adjuster plunger 4 and a second end wall 13 arranged on the cylinder barrel 5.

The adjuster plunger 4 is connected via a coupling bolt 14 to a roller-bearing ring 15, from which fuel 6 is distributed to the respective injector 16. The position of the roller-bearing ring 15 relative to a distributor arm 17 for the fuel 6 of the diesel engine 2 determines the injection time α of fuel 6 in the diesel engine 2. When the adjuster plunger 4 is displaced in the cylinder barrel 5, the roller-bearing ring 15 is turned. The adjuster plunger 4 and the roller-bearing ring 15 can be included as integrated parts in a distributor pump 18, which is represented diagrammatically by the broken-line rectangle 18 in FIG. 1.

The position of the adjuster plunger 4 and thus the position of the roller-bearing ring 15 are determined by the pressure of the fuel 6 in the cylinder chamber 7. A feed pump 19 integrated in the distributor pump 18 feeds the fuel 6 under pressure to the cylinder chamber 7 of the injection adjuster 3 as well as to the roller-bearing ring 15. A pressure control valve in the form of a solenoid valve 20 is arranged on a duct 21 which leads the fuel 6 from the feed pump 19 to the cylinder chamber 7. The solenoid valve 20 is regulated by a pulse-modulated pulse signal from a control unit 22.

A sensor 23 for measuring the fuel consumption of the diesel engine 2 is arranged on the fuel duct 24 between the feed pump 19 and the roller-bearing ring 15. The sensor 23 sends signals to the control unit 22. A first temperature sensor 25 is arranged in the cylinder chamber 7 and measures the temperature of the fuel 6. The first temperature sensor 25 sends signals to the control unit 22. A second temperature sensor 26 is arranged on the diesel engine 2 in order to measure the temperature of the cooling water (not shown) in the diesel engine 2. The second temperature sensor 26 sends signals to the control unit 22.

Figure 2:
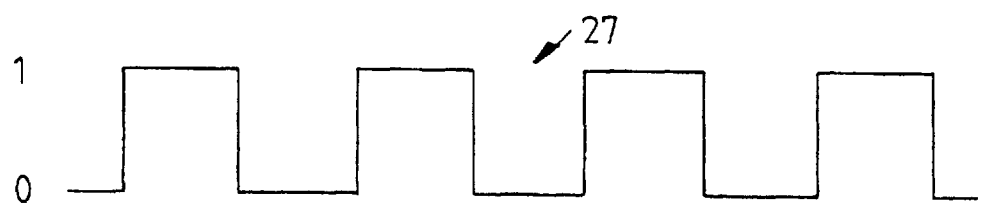
FIG. 2 shows a pulse signal with a first relative pulse length.

FIG. 2 shows a pulse signal 27 which controls the solenoid valve 20. The solenoid valve 20 comprises two elements 28 which together open and close a passage 29 for the fuel 6 in the duct 21. The longer the solenoid valve 20 is situated in the open position, the greater is the pressure of the fuel 6 in the cylinder chamber 7. At a relative pulse length of 100%, the pulse time, that is to say the same length, for the losed position (one 1) is the same length as the pulse length for the open position (zero 0).

Figure 3:
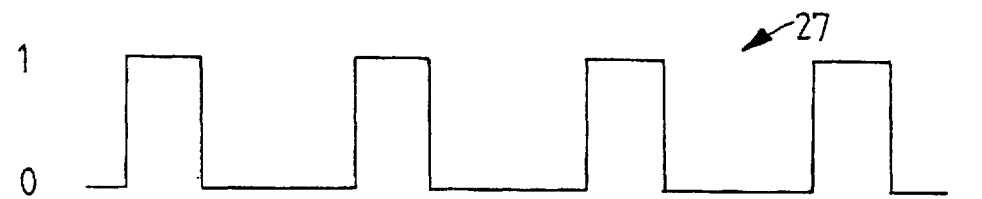
FIG. 3 shows a pulse signal with a second relative pulse length.

FIG. 3 shows a pulse signal 27 where the relative pulse length is less than 100%, that is to say the pulse length for the close position (one 1) is shorter than the pulse length for the open position (zero 0).

In diesel engines 2, the injection time α of the fuel 6 influences the degree of efficiency and the emissions given off on combustion. The setting of the injection time α is dependent, inter alia, on fuel consumption, engine speed and engine temperature. The optimum time for the start of injection must be obtained as accurately as possible. If the injection takes place too early, the injected fuel is vaporized only negligibly, since the temperature in the combustion chamber is too low. If the fuel is injected too late, the ignition of the fuel takes place only during the expansion stroke, which means that the plunger is accelerated only negligibly.

To obtain reference values for the calibration of the injection time α of fuel 6 in a diesel engine 2, use is made of a reference engine (not shown) which is run with a first fuel 6' with given viscosity. The reference engine is advantageously provided with an injection system 1 of the type which is shown diagrammatically in FIG. 1. With the aid of laboratory equipment and measuring equipment of known types, the reference engine is calibrated so that an optimum injection time α is obtained. The calibration is performed at a given temperature of the fuel and of the engine referred to as the reference temperature $t_1$. Starting from the calibrated reference engine, it is possible to obtain a predetermined injection time α1 at different given speeds. At the predetermined injection time α1, the adjuster plunger 4 is situated in a given position in the cylinder barrel 5 depending on a given pressure of the first fuel 6' in the cylinder chamber 7 of the injection adjuster 3. Values for the injection time α at different speeds and operating conditions of the reference engine are stored in the control unit 22.

On account of the fact that the properties of the components included in an injection system 1 differ from each other in terms of spring constant, flow conditions in ducts, and so on, the injection time α at one and the same pressure of the fuel 6 in the cylinder chamber 7 of the injection adjuster 3 will differ between injection systems 1 of the same type. In the case where the properties of the injection system 1 differ from the properties of the injection system 1 which was used in the calibration of the reference engine, the control unit 22 must therefore be provided with values which differ from the values which were fed into the control unit 22 when the reference engine was being calibrated. In the calibration method according to the present invention, the control unit 22 receives those values which mean that the control unit 22 controls the solenoid valve 20 so that a pressure of the fuel 6 in the cylinder chamber 7 of the injection adjuster 3 brings the adjuster plunger 4 and thus the roller-bearing ring 15 into such a position that an optimum injection time α is obtained.

The method for calibrating the injection time α according to the invention is carried out as follows. A first fuel 6' with a viscosity which accords with the fuel 6 which was used in the calibration of the reference engine is fed under pressure by means of the feed pump 19 to the injection adjuster 3, which includes the adjuster plunger 4. The diesel engine 2 is made to run at a constant speed r, for example by means of the control unit 22. The injection time α is adjusted by means of the fact that the relative pulse length of a pulse signal 27, which is fed from the control unit 22 to the solenoid valve 20, changes. As has been described above, the relative pulse length of the pulse signal 27 determines the pressure of the first fuel 6' which is fed to the cylinder chamber 7 of the injection adjuster 3. At the same time the fuel consumption of the diesel engine 2 is measured, which fuel consumption will vary with varying injection time α. The calibration is performed when the first fuel 6' or the diesel engine 2 has reached a temperature t which coincides with the reference temperature $t_1$.

Figure 4:
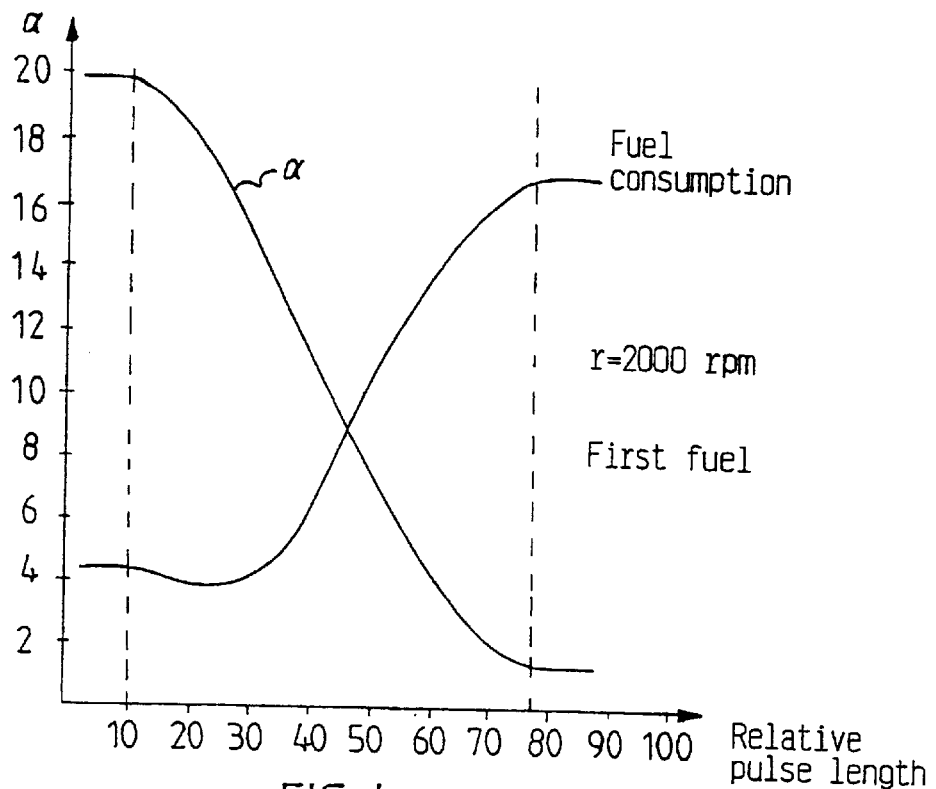
FIG. 4 shows, in diagram form, how the fuel consumption varies depending on the relative pulse length and injection time at a first constant speed and with a first fuel in a diesel engine.
Figure 5:
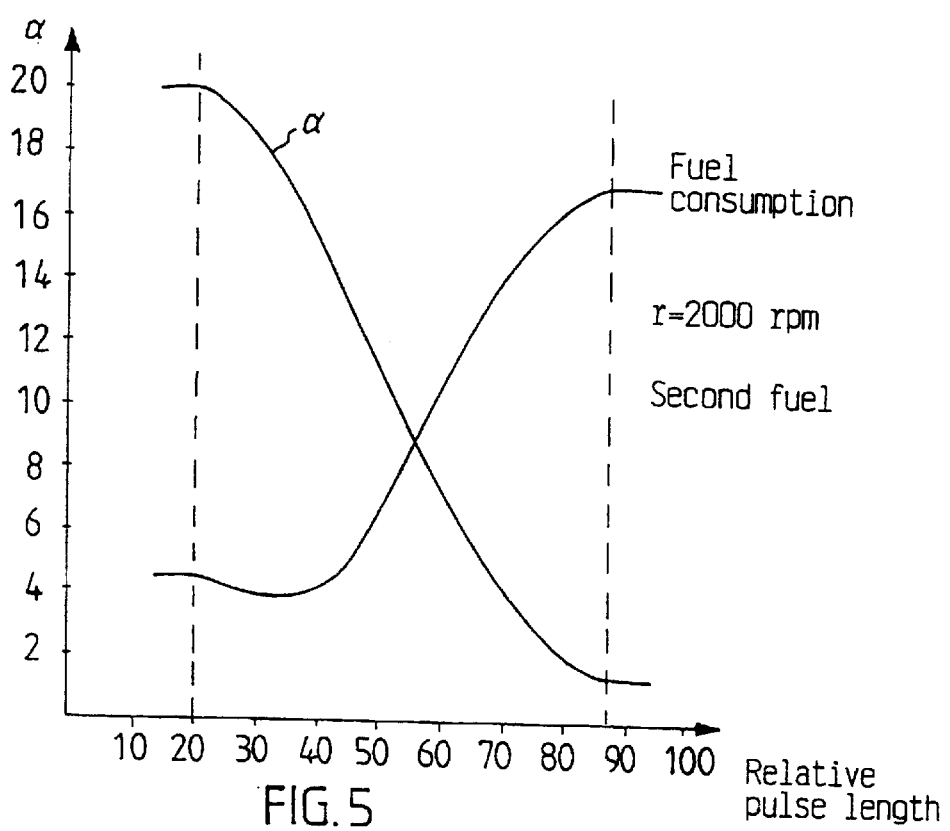
FIG. 5 shows, in diagram form, how the fuel consumption varies depending on the relative pulse length and injection time at a first constant speed and with a second fuel in a diesel engine.

The course of events according to the method is represented in FIG. 4 which shows, in the diagram form, how the fuel consumption varies depending on the relative pulse length and the injection time α at a first constant speed r of the diesel engine 2. When the adjuster plunger 4 is situated in a first end position, to the left in FIG. 1, in which the helical spring 12 presses the adjuster plunger 4 towards the first end wall 9, both the injection time α and the fuel consumption will initially be constant at an increasing relative pulse length, since the pressure must overcome the spring force from the helical spring 12 before the adjuster plunger 4 begins to be displaced in the cylinder barrel 5. At a relative pulse length of about 10% in FIG. 4, the injection time α and thus the fuel consumption begin to vary. At a relative pulse length of about 75% in FIG. 4, the pressure of the first fuel 6' is high enough to ensure that the adjuster plunger 4 reaches a second end position, in which the helical spring 12 is compressed. The injection time α and thus the fuel consumption then begin to vary.

The injection time α when the fuel consumption converts from varying to being constant and/or vice versa is recorded in the control unit 22 and the recorded injection time α is compared with the predetermined injection time α1 which was obtained for the reference engine at a speed which corresponds to the constant speed r in the calibration according to the method. Thereafter, the injection adjuster 3 is calibrated by means of regulating the pressure of the first fuel 6' so that the adjuster plunger 4 is set in a position which corresponds to an injection time α which accords with the predetermined injection time $\alpha_1$ which was obtained on calibrating the reference engine. The value for the relative pulse length which must be present at the constant speed r is thus known for the control unit 22 and is therefore stored in the latter. During operation of the diesel engine 2, the injection time α will thus vary optimally depending on, inter alia, the fuel consumption, engine speed and engine temperature.

The calibration of the injection time according to the invention can be repeated for a number of different constant speeds of the diesel engine 2, which means that more values of the relative pulse length which must be present at different speeds are known for the control unit 22. One reason for repeating the calibration method at different constant speeds may be to increase the accuracy of the injection system 1.

If a second fuel 6" with a viscosity other than the viscosity of the first fuel 6' is used for running the diesel engine 2, the injection time α will deviate from the optimum values which were obtained in the calibration according to the method.

By carrying out the calibration method again at one or more constant speeds with the second fuel 6" and using the values which were obtained in the calibration with the first fuel 6' in order to calibrate the injection time $\alpha_1$, an injection system 1 is obtained in which the injection time α will vary optimally.

The fuel 6 of different viscosity has different energy contents. The abovementioned calibration which is dependent on the viscosity of the fuel 6 is advantageous since excessive pressures can occur in the diesel engine 2 if the injection time α is wrong when a fuel 6 with high energy content is being used. In the calibration with the second fuel 6", a measure is also obtained of how great the difference is between the viscosity of the first fuel 6' and second fuel 6". This, the amount of injected fuel 6 in the diesel engine 2 can be regulated in order to obtain the same effect from the diesel engine 2 regardless of which fuel type 6 is being used.

What is claimed is:

1. Method for calibrating the injection time (α) of a first fuel (6') in a diesel engine (2), comprising the following steps:

feeding under pressure an adjustment fluid (6) to an injection adjuster (3) which includes an adjuster plunger (4);

running the diesel engine (2) at a constant speed (r);

adjusting the adjuster plunger with the aid of the pressure of the adjustment fluid (6), said adjuster plunger being coupled to a roller-bearing ring (15) for adjusting the injection time (α);

measuring the fuel consumption of the diesel engine (2);

recording the injection time (α), when the fuel consumption converts from varying to being constant, and/or vice versa;

comparing the recorded injection time (α) with a predetermined injection time ($\alpha_1$); and calibrating the injection adjuster (3) by regulating the pressure of the adjustment fluid (6) so that the adjuster plunger (4) is set in a position which corresponds to an injection time (α) which accords with the predetermined injection time ($\alpha_1$).

2. The method according to claim 1, wherein the pressure of the adjustment fluid (6) is regulated by a pressure control valve (20).

3. The method according to claim 2, wherein the pressure control valve (20) comprises a solenoid valve which is controlled by a pulse signal (27).

4. The method according to claim 3, wherein the pressure of the adjustment fluid is determined by modulating the pulse width of the pulse signal (27).

5. The method according to claim 1, further comprising measuring the temperature (t) of the adjustment fluid (6), and adjusting the adjuster plunger (4) and thus the injection time (α) when the adjustment fluid (6) has reached a temperature which accords with a predetermined reference temperature ($t_1$).

6. The method according to claim 1, wherein the adjustment fluid (6) consists of the first fuel (6') of the diesel engine.

7. The method according to claim 1, wherein the calibration of the injection time (α) according to the method is repeated for a number of different constant speeds of the diesel engine (2).

8. Method for calibrating the injection time (α) of a second fuel (6") in a diesel engine (2) which has been calibrated by the method according to claim 6, further comprising:

replacing the first fuel (6') which has been used for calibrating the diesel engine (2) by the second fuel (6") which has a viscosity differing from the viscosity of the first fuel (6');

feeding the second fuel (6") under pressure to an injection adjuster (3) which includes an adjuster plunger (4);

running the diesel engine (2) at a constant speed (r);

adjusting the adjuster plunger with the aid of the pressure of the second fuel (6"), said adjuster plunger being coupled to a roller-bearing ring (15) for adjusting the injection time (α);

measuring the fuel consumption of the diesel engine (2);

recording the injection time (α), when the fuel consumption converts from varying to being constant, and/or vice versa;

comparing the recorded injection time (α) with the injection time (α) which was obtained upon calibration with the first fuel (6'), at a speed which corresponds to said constant speed (r); and calibrating the injection adjuster (3) by regulating the pressure of the second fuel (6") so that the adjuster plunger (4) is set in a position which corresponds to an injection time (α) which accords with the injection time which was obtained upon calibration with the first fuel (6').

9. The method according to claim 8, wherein the pressure of the second fuel (6") is regulated with a pressure control valve (20).

10. The method according to claim 9, wherein the pressure control valve (20) comprises a solenoid valve which is controlled by a pulse signal (27).

11. The method according to claim 10, wherein the pressure of the second fuel (6") is determined by modulating the pulse width of the pulse signal (27).

12. The method according to claim 8, further comprising measuring the temperature of the second fuel (6"), and adjusting the adjuster plunger (4) and thus the injection time (α) when the second fuel (6") has reached a temperature (t) which accords with a predetermined reference temperature ($t_1$).

* * * * *